United States Patent [19]

Yoshida et al.

[11] Patent Number: 6,114,070
[45] Date of Patent: Sep. 5, 2000

[54] LITHIUM SECONDARY BATTERY

[75] Inventors: Toshikazu Yoshida, Hirakata; Ryuji Ohshita, Neyagawa; Masahisa Fujimoto, Osaka; Toshiyuki Nohma; Koji Nishio, both of Hirakata, all of Japan

[73] Assignee: Sanyo Electric Co., Ltd., Osaka, Japan

[21] Appl. No.: 09/069,158

[22] Filed: Apr. 29, 1998

[30] Foreign Application Priority Data

Jun. 19, 1997 [JP] Japan .................................. 9-180395

[51] Int. Cl.$^7$ ................................................ H01M 10/40
[52] U.S. Cl. ........................................ 429/332; 429/231.8
[58] Field of Search .................................. 429/324, 332, 429/333, 338, 231.4, 231.8

[56] References Cited

U.S. PATENT DOCUMENTS

| | | | |
|---|---|---|---|
| 5,260,145 | 11/1993 | Armand et al. | 429/338 X |
| 5,389,467 | 2/1995 | Herr et al. | 429/332 X |
| 5,472,809 | 12/1995 | Perton et al. | . |
| 5,478,673 | 12/1995 | Funatsu | 429/333 X |
| 5,508,130 | 4/1996 | Golovin | . |
| 5,510,212 | 4/1996 | Delnick et al. | 429/231.4 |
| 5,514,493 | 5/1996 | Waddell et al. | . |
| 5,698,341 | 12/1997 | Tamaki et al. | 429/231.8 |
| 5,723,232 | 3/1998 | Yamada et al. | 429/231.8 X |

FOREIGN PATENT DOCUMENTS

| | | |
|---|---|---|
| 43 17 032A1 | 11/1994 | Germany . |
| 5-062690 | 3/1993 | Japan . |
| 5-326016 | 12/1993 | Japan . |
| 7-85888A | 3/1995 | Japan . |
| 7-192760A | 7/1995 | Japan . |
| 7-192761A | 7/1995 | Japan . |
| 8-31452A | 2/1996 | Japan . |
| 8-064237 | 3/1996 | Japan . |
| 9-050823 | 2/1997 | Japan . |
| Wo 97/11504A1 | 3/1997 | WIPO . |

*Primary Examiner*—Stephen Kalafut
*Attorney, Agent, or Firm*—Birch, Stewart, Kolasch & Birch, LLP

[57] ABSTRACT

A lithium secondary battery comprising a nonaqueous electrolyte obtained by dissolving an electrolytic salt in a solvent, a negative electrode comprising a negative electrode material and a positive electrode comprising a positive electrode active material, the electrolytic salt comprising: at least one electrolytic salt A selected from the group consisting of $LiPF_6$, $LiAsF_6$, $LiSbF_6$, $LiBF_4$, $LiBiF_4$, $LiAlF_4$, $LiGaF_4$, $LiInF_4$ and $LiClO_4$, and at least one electrolytic salt B selected from the group consisting of $LiN(C_nF_{2n+1}SO_2)_2$ wherein n is an integer of 1, 2, 3 or 4 and $LiC(C_mF_{2m+1}SO_2)_3$ wherein m is an integer of 1, 2, 3 or 4. The battery is superior in the aspects of storage characteristic in a charged condition.

14 Claims, 1 Drawing Sheet

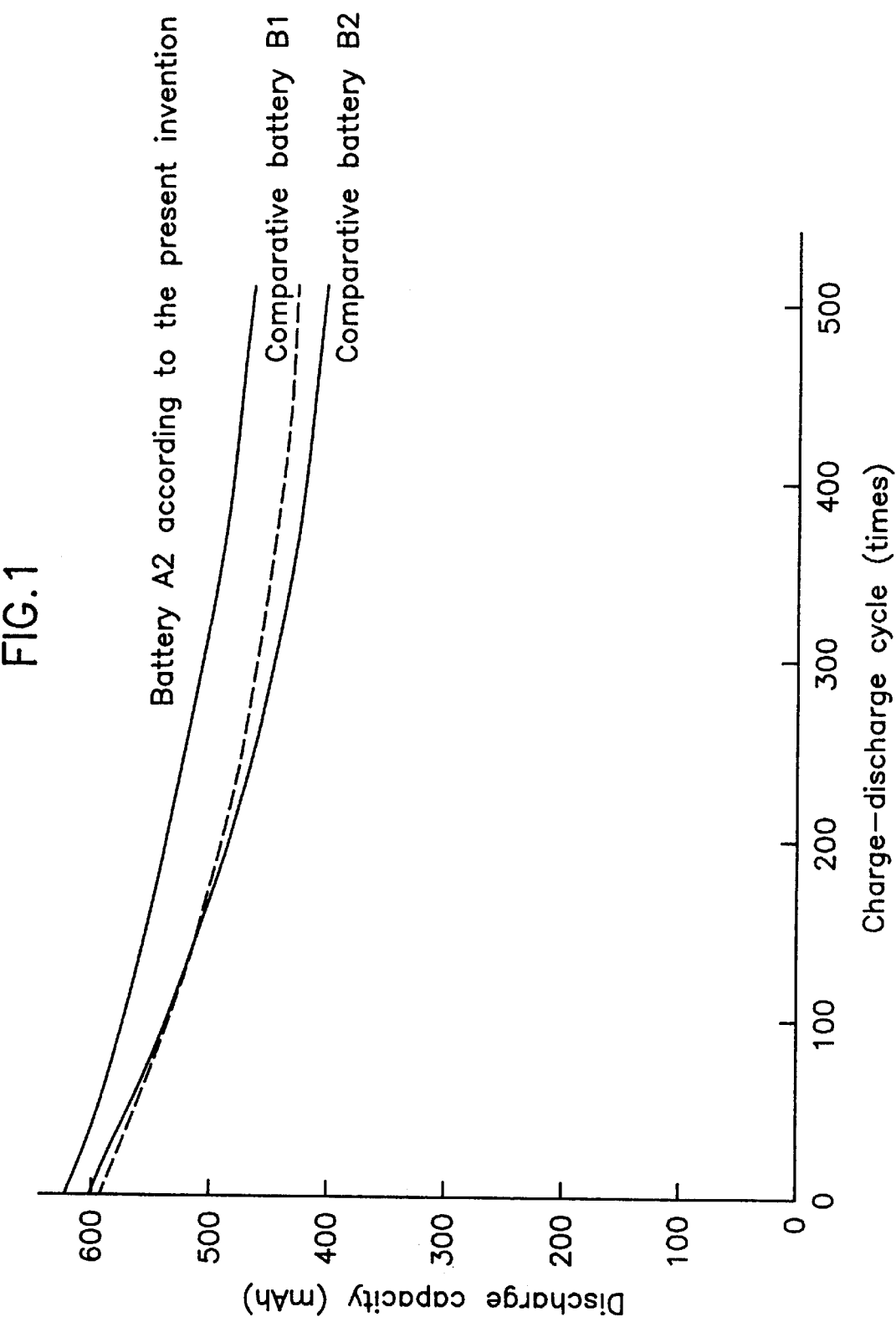

LITHIUM SECONDARY BATTERY

BACKGROUND OF THE INVENTION

This application claims the priority of Japanese Patent Application No. 9-180395 filed on Jun. 19, 1997.

1. Field of the Invention

The present invention relates to a lithium secondary battery and, more particularly, to an improvement of an electrolytic salt of a nonaqueous electrolyte for the purpose of improving a storage characteristic of the secondary battery of this type in a charged condition (hereinafter referred to as "charge-storage characteristic").

2. Description of the Prior Art

Battery characteristics of the lithium secondary battery depend largely on the kind of nonaqueous electrolyte employed. Therefore, several kinds of nonaqueous electrolytes comprising electrolytic salts (solutes) and solvents have been heretofore proposed. For example, it is disclosed in the Japanese Laid-Open Patent Publication (unexamined) No. 8-31452 that a charge-discharge cycle life is improved by employing as an electrolytic salt $LiN(CF_3SO_2)_2$ (lithiumtrifluoromethanesulfonyl imide) which is highly stable with respect to the solvent and difficult to be decomposed at the time of charge-discharge reaction.

However, as a result of researches conducted by the inventors, it has been found that in the lithium secondary battery in which $LiN(CF_3SO_2)_2$ alone is employed as the electrolytic salt, there is a problem of considerable self-discharge when the battery is stored in a charged state.

SUMMARY OF THE INVENTION

Accordingly, the present invention was made to solve the above-discussed problem incidental to the prior art and has an object of providing a lithium secondary battery of which charge-storage characteristic is remarkably superior as compared with the conventional battery in which $LiN(CF_3SO_2)_2$ alone is employed as the electrolytic salt.

To accomplish the foregoing object, in the lithium secondary battery according to the invention, at least one electrolytic salt A selected from the group consisting of $LiPF_6$, $LiAsF_6$, $LiSbF_6$, $LiBF_4$, $LiBiF_4$, $LiAlF_4$, $LiGaF_4$, $LiInF_4$ and $LiClO_4$ and at least one electrolytic salt B selected from the group consisting of $LiN(C_nF_{2n+1}SO_2)_2$ wherein n is an integer of 1, 2, 3 or 4 and $LiC(C_mF_{2m+1}SO_2)_3$ wherein m is an integer of 1, 2, 3 or 4 are employed together as an electrolytic salt (solute) of a nonaqueous electrolyte.

It is preferable to employ $LiPF_6$ as the electrolytic salt A and $LiN(C_nF_{2n+1}SO_2)_2$ wherein n is an integer of 1, 2, 3 or 4 as the electrolytic salt B, and it is more preferable that $LiN(C_2F_5SO_2)_2$ is employed as the electrolytic salt B. The molar ratio between the electrolytic salt A and the electrolytic salt B is preferably in a range of 1:9 to 9:1. If the molar ratio is out of this range, the charge-storage characteristic is lowered.

As mentioned above, the invention relates to an improvement of an electrolytic salt of a nonaqueous electrolyte. Hence, it is allowed to employ any of conventional materials for the lithium secondary battery as far as other battery materials than the electrolytic salt are concerned.

Examples of the positive electrode active material employed in the invention are $MnO_2$; a composite oxide comprising Li and one kind of transition metal such as $LiMn_2O_4$, $LiCoO_2$, $LiNiO_2$, $LiFeO_2$, $LiTiO_2$, etc.; and a composite oxide comprising Li and several kinds of transition metals. An example of the composite oxide comprising Li and several kinds of transition metals is a composite oxide comprising Li and at least two transition metals selected from the group consisting of Co, Ni, Mn and Fe.

Examples of the negative electrode material employed in the invention are a metallic lithium; a lithium alloy such as a lithium-aluminum alloy, a lithium-lead alloy, a lithium-tin alloy, etc.; a carbon material such as graphite, coke, baked organic substance, etc.; and a metal oxide such as $SnO_2$, $SnO$, $TiO_2$, $Nb_2O_3$, etc. having an electric potential lower than that of the positive electrode active material. In case of employing a carbon material as the negative electrode material, in view of obtaining a lithium secondary battery of superior charge-storage characteristic, it is preferable to employ a carbon material in which spacing ($d_{002}$) between lattice planes (002) is not more than 3.37 Å, and length ($L_c$) of crystallite in the c-axis direction is not less than 200 Å.

Examples of the solvent for the nonaqueous electrolyte employed in the invention are a cyclic carbonate such as ethylene carbonate (EC), propylene carbonate (PC), vinylene carbonate (VC), butylene carbonate (BC), etc., and a mixed solvent comprising the mentioned cyclic carbonate and a low boiling point solvent such as dimethyl carbonate (DMC), diethyl carbonate (DEC), methylethyl carbonate (MEC), 1,2-dimethoxyethane (DME), 1,2-diethoxyethane (DEE), ethoxymethoxyethane (EME), etc. In particular, an example of a solvent compatible with the electrolytic salt defined in the invention and particularly desirable in view of improving the charge-storage characteristic, is a mixed solvent comprising at least one cyclic carbonate and at least one linear carbonate in a volume ratio of 4:1 to 1:4.

The batteries according to the invention are superior in the aspect of storage characteristic when stored in a charged condition. Perhaps, this is because, by the reaction between the electrolytic salt (electrolytic salt A and electrolytic salt B) and the electrodes (positive and negative electrodes), a fluorine-containing layer capable of being stable even in the charged condition is formed on the surface of the electrodes, and this fluorine-containing layer may restrain a reaction (self-discharge) between the electrodes stored in the charged condition and the nonaqueous electrolyte followed by a decomposition of the solvent of the nonaqueous electrolyte.

The invention is particularly useful when applied to the lithium secondary battery in which a manganese-containing oxide such as $MnO_2$, $LiMn_2O_4$, $LiNi_{0.8}Co_{0.1}Mn_{0.1}O_2$, $Li_2CoNi_{0.8}Mn_{0.2}O_4$ or $LiNi_{0.5}Co_{0.3}Mn_{0.1}Fe_{0.1}O_2$ is partially or entirely employed as the positive electrode active material. This is because as a result of the fluorine-containing layer being formed, not only the decomposition of the solvent, i.e., the deterioration of the nonaqueous electrolyte when stored in the charged condition is restrained, but also elution of manganese to the nonaqueous solution is restrained.

Since specific electrolytic salts are employed as the electrolytic salts of the nonaqueous electrolyte in the batteies according to the invention, the charge-storage characteristic thereof is superior.

BRIEF DESCRIPTION OF THE DRAWING

Other objects, features and advantages of the invention will become apparent in the course of the following description of the preferred embodiments with reference to the accompanying drawing, wherein:

FIG. 1 is a graph showing the charge-discharge cycle characteristics of the battery according to the invention and the comparative batteries.

EXAMPLE

The invention is hereinafter described in more detail showing several examples, and it is to be understood that the invention is not limited to those examples and various changes and modifications may be made without departing from the spirit of the invention. In the lithium secondary battery employing a manganese-containing oxide as the positive electrode active material, there is a peculiar problem of reduction in discharge capacity due to elution of manganese, in addition to the common problem of reduction in discharge capacity due to decomposition of the solvent in the charged condition which is almost irrespective of the kind of active material. Therefore, in this example, experiments were carried out by classifying batteries into those not containing manganese in the positive electrode and those containing manganese in the positive electrode. That is, Examples 1 to 5 show the experiments on the former batteries, and Examples 6 to 9 show the experiments on the latter batteries.

Example 1

In this example, with respect to the lithium secondary battery of which positive electrode active material is $LiCoO_2$, a relation between the kind of electrolytic salt and the charge-storage characteristic was examined.

[Preparation of positive electrode]

A slurry was prepared by mixing 90 parts by weight of $LiCoO_2$ powder, 5 parts by weight of artificial graphite powder, and an N-methyl-2-pyrolidone (NMP) solution of 5 parts by weight of polyvinylidene fluoride. The slurry was then applied to both sides of an aluminum foil by doctor blade method to form an active material layer. Then, the slurry was vacuum-dried at 150° C. for two hours to prepare a positive electrode.

Preparation of negative electrode

A slurry was prepared by mixing 95 parts by weight of natural graphite and an NMP solution of 5 parts by weight of polyvinylidene fluoride. The slurry was then applied to both sides of a copper foil by doctor blade method to form an active material layer. Then, the slurry was vacuum-dried at 150° C. for two hours to prepare a negative electrode.

Preparation of nonaqueous electrolyte 8 kinds of nonaqueous electrolytes were prepared by dissolving 0.5 mol/litter of $LiPF_6$ and 0.5 mol/litter of electrolytic salt B shown in Table 1 in a mixed solvent of ethylene carbonate and diethyl carbonate in a volume ratio of 1:1. Further, 7 nonaqueous electrolytes were prepared by dissolving 0.5 mol/litter of electrolytic salt A shown in Table 1 and 0.5 mol/litter of $LiN(C_2F_5SO_2)_2$ in the same mixed solvent as mentioned above. Furthermore, 2 nonaqueous electrolytes were prepared by dissolving 1 mol/litter of $LiN(CF_3SO_2)_2$ or $LiPF_6$ in the same mixed solution as mentioned above.

TABLE 1

| Battery | Electrolytic salt (all molar ratio between two Electrolytic salts is 1:1) | Discharge capacity before storage C1 (mAh) | Discharge capacity after storage C2 (mAh) | Capacity survival rate (%) |
|---|---|---|---|---|
| A1 | $LiPF_6$ + $LiN(CF_3SO_2)_2$ | 605 | 520 | 86.0 |
| A2 | $LiPF_6$ + $LiN(C_2F_5SO_2)_2$ | 610 | 535 | 87.7 |
| A3 | $LiPF_6$ + $LiN(C_3F_7SO_2)_2$ | 600 | 515 | 85.8 |
| A4 | $LiPF_6$ + $LiN(C_4F_9SO_2)_2$ | 595 | 500 | 84.0 |
| A5 | $LiPF_6$ + $LiC(CF_3SO_2)_3$ | 600 | 500 | 83.3 |
| A6 | $LiPF_6$ + $LiC(C_2F_5SO_2)_3$ | 605 | 505 | 83.5 |
| A7 | $LiPF_6$ + $LiC(C_3F_7SO_2)_3$ | 600 | 500 | 83.3 |
| A8 | $LiPF_6$ + $LiC(C_4F_9SO_2)_3$ | 595 | 495 | 83.2 |
| A9 | $LiAsF_6$ + $LiN(C_2F_5SO_2)_2$ | 605 | 510 | 84.3 |
| A10 | $LiSbF_6$ + $LiN(C_2F_5SO_2)_2$ | 595 | 490 | 82.4 |
| A11 | $LiBF_4$ + $LiN(C_2F_5SO_2)_2$ | 605 | 505 | 86.0 |
| A12 | $LiBiF_4$ + $LiN(C_2F_5SO_2)_2$ | 590 | 475 | 86.0 |
| A13 | $LiAlF_4$ + $LiN(C_2F_5SO_2)_2$ | 585 | 475 | 86.0 |
| A14 | $LiGaF_4$ + $LiN(C_2F_5SO_2)_2$ | 585 | 480 | 86.0 |
| A15 | $LiInF_4$ + $LiN(C_2F_5SO_2)_2$ | 590 | 480 | 86.0 |
| B1 | $LiN(CF_3SO_2)_2$ alone | 595 | 420 | 70.6 |
| B2 | $LiPF_6$ alone | 600 | 420 | 70.0 |

Preparation of lithium secondary battery

Employing the mentioned positive electrode, negative electrode and nonaqueous electrolytes, lithium secondary batteries of AA size (14 mm in external diameter, 50 mm in height), that is, batteries A1 to A15 according to the invention and comparative batteries B1, B2 were respectively prepared. A separator of a polypropylene microporous film was employed in every battery.

Test of charge-storage characteristic

After charging each battery with a constant current of 200 mA up to 4.2V at a room temperature (25° C.), a constant current discharge was performed at 200 mA up to 2.75V, and a discharge capacity C1 before the storage of each battery was measured. Then, after charging the same batteries with a constant current of 200 mA up to 4.2V at 25° C. and storing them at 60° C. for 20 days, the batteries were taken out and the battery temperature was returned to the room temperature. Thereafter, a constant current discharge was performed at 200 mA up to 2.75V to obtain a discharge capacity C2 after the storage of each battery. From the discharge capacity C1 before the storage and the discharge capacity C2 after the storage, a capacity survival rate after the storage was calculated on the following expression:

Capacity survival rate (%)=(C2/C1)×100

Table 1 shows the results.

It is understood from Table 1 that the batteries A1 to A15 according to the invention show a high capacity survival rate after the storage, and the charge-storage characteristic thereof is high, as compared with those of the comparative batteries B1 and B2 employing $LiN(CF_3SO_2)_2$ alone and $LiPF_6$ alone, respectively. It is further understood from Table 1 that the charge-storage characteristic of the battery A2 according to the invention is particularly superior, and therefore it is most preferable to employ both $LiPF_6$ and $LiN(C_2F_5SO_2)_2$ together as the electrolytic salt.

Example 2

In this example, with respect to the lithium secondary battery of which positive electrode active material is $LiCoO_2$, a preferred molar ratio between the electrolytic salt A and the electrolytic salt B was examined.

Batteries A16 to A23 according to the invention were prepared in the same manner as in Example 1, except that nonaqueous electrolytes were prepared by dissolving 1 mol/litter of a mixture shown in Table 2 comprising $LiPF_6$ and $LiN(C_2F_5SO_2)_2$ of various molar ratios therebetween in a mixed solvent of ethylene carbonate and diethyl carbonate in a volume ratio of 1:1 and the nonaqueous electrolytes thus obtained were employed. Then, tests of charge-storage characteristic were carried out on the same conditions as in Example 1. Table 2 shows the results. Table 2 also shows the test results of the battery A2 according to the invention and the comparative batteries B1, B2 each transferred from Table 1.

TABLE 2

| Battery | Molar ratio between LiPF$_6$ and LiN(C$_2$F$_5$SO$_2$)$_2$ | Discharge capacity before storage C1 (mAh) | Discharge capacity after storage C2 (mAh) | Capacity survival rate (%) |
|---|---|---|---|---|
| B2 | LiPF$_6$ alone | 600 | 420 | 70.0 |
| A16 | 19:1 | 600 | 475 | 79.2 |
| A17 | 9:1 | 595 | 495 | 83.2 |
| A18 | 4:1 | 595 | 510 | 85.7 |
| A19 | 3:2 | 605 | 525 | 86.8 |
| A2 | 1:1 | 610 | 535 | 87.7 |
| A20 | 2:3 | 605 | 525 | 86.8 |
| A21 | 1:4 | 605 | 510 | 84.3 |
| A22 | 1:9 | 595 | 495 | 83.2 |
| A23 | 1:19 | 600 | 470 | 78.3 |
| B1 | LiN(CF$_3$SO$_2$)$_2$ alone | 595 | 420 | 70.6 |

As shown in Table 2, the charge-storage characteristic of the batteries A2, A17 to A22 according to the invention are particularly superior. It is understood from this fact that it is preferable to employ the electrolytic salt in which a molar ratio between LiPF$_6$ and LiN(C$_2$F$_5$SO$_2$)$_2$ is in a range of 1:9 to 9:1. It was further acknowledged that also in case of employing the electrolytic salt A other than LiPF$_6$ and the electrolytic salt B other than LiN(C$_2$F$_5$SO$_2$)$_2$, the molar ratio between the two electrolytic salts is preferably in a range of 1:9 to 9:1.

Example 3

In this example, with respect to the lithium secondary battery of which positive electrode active material is LiCoO$_2$, a relation between the kind of solvent and the charge-storage characteristic was examined.

Batteries A24 to A27 according to the invention were prepared in the same manner as in Example 1, except that nonaqueous electrolytes were prepared by dissolving 1 mol/litter of a mixture of a molar ratio of 1:1 comprising LiPF$_6$ and LiN(C$_2$F$_5$SO$_2$)$_2$ in various mixed solvents shown in Table 3 in a volume ratio of 1:1 and the nonaqueous electrolytes thus obtained were employed. Then, tests of charge-storage characteristic were carried out on the same conditions as in Example 1. Table 3 shows the results. Table 3 also shows the test results of the battery A2 according to the invention transferred from Table 1.

TABLE 3

| Battery | Solvent (all molar ratio is 1:1) | Discharge capacity before storage C1 (mAh) | Discharge capacity after storage C2 (mAh) | Capacity survival rate (%) |
|---|---|---|---|---|
| A2 | EC + DEC | 610 | 535 | 87.7 |
| A24 | EC + DMC | 610 | 530 | 86.9 |
| A25 | EC + MEC | 610 | 535 | 87.7 |
| A26 | EC + DME | 595 | 480 | 80.7 |
| A27 | γ-BL + DEC | 590 | 475 | 80.5 |

EC: ethylene carbonate
DMC: dimethyl carbonate
DME: 1,2-dimethoxyethane
DEC: diethyl carbonate
MEC: methylethyl carbonate
γ-BL: γ-butyrolactone As shown in Table 3, the charge-storage characteristics of the batteries A2, A24 and A25 according to the invention are particularly superior. It is understood from this fact that it is preferable to employ the mixed solvent comprising cyclic carbonate and linear carbonate. It was further acknowledged that the volume ratio between the two carbonates is preferably in a range of 4:1 to 1:4.

Example 4

In this example, a relation between the kind of positive electrode active material (LiCoO$_2$, LiNiO$_2$, LiFeO$_2$ or LiTiO$_2$) and the charge-storage characteristic was examined.

Batteries A28 to A30 according to the invention were prepared in the same manner as in Example 1, except that LiNiO$_2$, LiFeO$_2$ or LiTiO$_2$ was employed as the positive electrode active material. Then, tests of charge-storage characteristic were carried out on the same conditions as in Example 1. In addition, 0.5 mol/litter of LiPF$_6$ and 0.5 mol/litter of LiN(C$_2$F$_5$SO$_2$)$_2$ were dissolved in a mixed solvent of ethylene carbonate and diethyl carbonate in a volume ratio of 1:1, and employed as a nonaqueous electrolyte. Table 4 shows the results. Table 4 also shows the test results of the battery A2 (positive electrode active material: LiCoO$_2$) according to the invention transferred from Table 1.

TABLE 4

| Battery | Positive electrode active material | Discharge capacity before storage C1 (mAh) | Discharge capacity after storage C2 (mAh) | Capacity survival rate (%) |
|---|---|---|---|---|
| A2 | LiCoO$_2$ | 610 | 535 | 87.7 |
| A28 | LiNiO$_2$ | 610 | 530 | 86.9 |
| A29 | LiFeO$_2$ | 575 | 500 | 87.0 |
| A30 | LiTiO$_2$ | 600 | 470 | 78.3 |

It is understood from Table 4 that a lithium secondary battery of superior charge-storage characteristic is obtained according to the invention irrespective of the kind of positive electrode active material.

Example 5

In this example, with respect to the lithium secondary battery of which positive electrode active material is LiCoO$_2$, a relation between the kind of electrolytic salt and the charge-discharge cycle characteristic was examined.

Each of the battery A2 according to the invention and the comparative batteries B1, B2 was subjected to a charge-discharge cycle test, in which one cycle consists of a constant current charge at room temperature with 200 mA up to 4.2V and a constant current discharge at room temperature with 200 mA up to 2.75V.

FIG. 1 shows the results. FIG. 1 is a graph showing the charge-discharge cycle characteristic of each battery, and in which the ordinate shows a discharge capacity (mAh) and the abscissa shows a charge-discharge cycle (times).

It is understood from FIG. 1 that the battery A2 according to the invention is superior in the aspect of a charge-discharge cycle characteristic as compared with the comparative batteries B1, B2.

Example 6

In this example, with respect to the lithium secondary battery of which positive electrode active material is manganese-containing oxide, a relation between the kind of electrolytic salt and the charge-storage characteristic was examined.

Preparation of positive electrode

A slurry was prepared by mixing 90 parts by weight of an $LiMn_2O_4$ powder or an $LiMn_2O_4$ and $LiCoO_2$ mixed powder (weight ratio between them is 1:1), 5 parts by weight of an artificial graphite powder, and an N-methyl-2-pyrolidone (NMP) solution of 5 parts by weight of polyvinylidene fluoride. The slurry was applied to both sides of an aluminum foil by doctor blade method to form an active material layer. Then, the slurry was vacuum-dried at 150° C. for two hours to prepare a positive electrode.

Preparation of negative electrode

A slurry was prepared by mixing 95 parts by weight of natural graphite ($d_{002}$=3.35 Å; Lc>1000 Å) and an NMP solution of 5 parts by weight of polyvinylidene fluoride. The slurry was applied to both sides of a copper foil by doctor blade method to form an active material layer. Then, the slurry was vacuum-dried at 150° C. for two hours to prepare a negative electrode.

Preparation of nonaqueous electrolyte

Nonaqueous electrolytes were prepared by dissolving 1 mol/litter of an electrolytic salt shown in Table 5 in a mixed solvent of ethylene carbonate and diethyl carbonate in a volume ratio of 1:1.

TABLE 5

| Battery | Electrolytic salt (all molar ratio between two Electrolytic salts is 1:1) | Discharge capacity before storage C1 (mAh) | Discharge capacity after storage C2 (mAh) | Capacity survival rate (%) |
|---|---|---|---|---|
| A31 | $LiClO_4$ + $LiN(CF_3SO_2)_2$ | 575 | 465 | 80.9 |
| A32 | $LiClO_4$ + $LiN(C_2F_5SO_2)_2$ | 580 | 470 | 81.0 |
| A33 | $LiClO_4$ + $LiN(C_3F_7SO_2)_2$ | 580 | 465 | 80.2 |
| A34 | $LiClO_4$ + $LiN(C_4F_9SO_2)_2$ | 575 | 460 | 80.0 |
| A35 | $LiClO_4$ + $LiC(CF_3SO_2)_3$ | 570 | 460 | 80.7 |
| A36 | $LiClO_4$ + $LiC(C_2F_5SO_2)_3$ | 575 | 465 | 80.9 |
| A37 | $LiClO_4$ + $LiC(C_3F_7SO_2)_3$ | 570 | 460 | 80.7 |
| A38 | $LiClO_4$ + $LiC(C_4F_9SO_2)_3$ | 565 | 455 | 80.5 |
| A39 | $LiPF_6$ + $LiN(C_2F_5SO_2)_2$ | 580 | 505 | 87.1 |
| A40 | $LiAsF_6$ + $LiN(C_2F_5SO_2)_2$ | 575 | 485 | 84.3 |
| A41 | $LiSbF_6$ + $LiN(C_2F_5SO_2)_2$ | 565 | 480 | 85.0 |
| A42 | $LiBF_4$ + $LiN(C_2F_5SO_2)_2$ | 570 | 490 | 86.0 |
| A43 | $LiBiF_4$ + $LiN(C_2F_5SO_2)_2$ | 565 | 485 | 85.8 |
| A44 | $LiAlF_4$ + $LiN(C_2F_5SO_2)_2$ | 560 | 480 | 85.8 |
| A45 | $LiGaF_4$ + $LiN(C_2F_5SO_2)_2$ | 560 | 475 | 84.8 |
| A46 | $LiInF_4$ + $LiN(C_2F_5SO_2)_2$ | 565 | 480 | 85.0 |
| B3 | $LiClO_4$ alone | 560 | 375 | 67.0 |
| B4 | $LiClO_4$ alone | 590 | 430 | 72.9 |

Preparation of lithium secondary battery

Employing the mentioned positive electrode, negative electrode and nonaqueous electrolytes, lithium secondary batteries of AA size (14 mm in external diameter, 50 mm in height), i.e., batteries A31 to A46 according to the invention and comparative batteries B3, B4 were respectively prepared. In the batteries A31 to A46 according to the invention and the comparative battery B3, $LiMn_2O_4$ was employed as a positive electrode active material, and in the comparative battery B4, a mixture comprising $LiMn_2O_4$ and $LiCoO_2$ (weight ratio between them is 1:1) was employed as a positive electrode active material.

Test of charge-storage characteristic

A charge-storage characteristic test was carried out on each battery on the same conditions as in Example 1. Table 5 shows the results.

It is understood from Table 5 that the batteries A31 to A46 according to the invention show a high charge-storage characteristic as compared with the comparative batteries B3, B4. Perhaps, this is because a fluorine-containing layer existing stably even in the charged condition is formed on the surface of the positive electrode and the negative electrode, and this fluorine-containing layer restrains the reaction between the electrodes and the nonaqueous electrolyte and the elution of manganese contained in the positive electrode active material. Further, the batteries A39 to A46 according to the invention are superior in the aspect of charge-storage characteristic as compared with the batteries A31 to A38 according to the invention. It is understood from this fact that it is preferable to employ $LiPF_6$, $LiAsF_6$, $LiSbF_6$, $LiBF_4$, $LiBiF_4$, $LiAlF_4$, $LiGaF_4$ or $LiInF_4$ as the electrolytic salt.

Example 7

In this example, with respect to the lithium secondary battery of which positive electrode active material is $LiMn_2O_4$, a preferred molar ratio between the electrolytic salt A and the electrolytic salt B was examined.

Batteries A47 to A52 according to the invention and comparative batteries B5, B6 were prepared in the same manner as in the preparation of the battery A39 according to the invention, except that nonaqueous electrolytes were prepared by dissolving 1 mol/litter of a mixture shown in Table 6 comprising $LiPF_6$ and $LiN(C_2F_5SO_2)_2$ of various molar ratios therebetween in a mixed solvent of ethylene carbonate and diethyl carbonate in a volume ratio of 1:1 and each nonaqueous electrolyte thus obtained was employed. Then, tests of charge-storage characteristic were carried out on the same conditions as in Example 1. Table 6 shows the results. Table 6 also shows the test results of the battery A39 according to the invention transferred from Table 5.

TABLE 6

| Battery | Molar ratio between $LiPF_6$ and $LiN(C_2F_5SO_2)_2$ | Discharge capacity before storage C1 (mAh) | Discharge capacity after storage C2 (mAh) | Capacity survival rate (%) |
|---|---|---|---|---|
| B5 | $LiPF_6$ alone | 565 | 390 | 69.0 |
| A47 | 19:1 | 565 | 435 | 77.0 |
| A48 | 9:1 | 570 | 480 | 84.2 |
| A49 | 7:3 | 575 | 495 | 86.1 |
| A39 | 1:1 | 580 | 505 | 87.1 |
| A50 | 3:7 | 570 | 495 | 86.8 |
| A51 | 1:9 | 570 | 480 | 84.2 |
| A52 | 1:19 | 565 | 440 | 77.9 |
| B6 | $LiN(C_2F_5SO_2)_2$ alone | 555 | 400 | 72.1 |

As shown in Table 6, the charge-storage characteristic of the batteries A39, A48 to A51 according to the invention is particularly superior. It is understood from this fact that it is preferable to employ the electrolytic salt in which the molar ratio between $LiPF_6$ and $LiN(C_2F_5SO_2)_2$ is in a range of 1:9 to 9:1. It was further acknowledged that also in case of employing the electrolytic salt A other than $LiPF_6$ and the electrolytic salt B other than $LiN(C_2F_5SO_2)_2$, the molar ratio between the two electrolytic salts is preferably in a range of 1:9 to 9:1.

Example 8

In this example, with respect to the lithium secondary battery of which positive electrode active material is $LiMn_2O_4$, a relation between the kind of solvent and the charge-storage characteristic was examined.

Batteries A53 to A56 according to the invention were prepared in the same manner as in the preparation of the battery A39 according to the invention, except that nonaqueous electrolytes were prepared by dissolving 1 mol/litter of a mixture of a molar ratio of 1:1 comprising $LiPF_6$ and $LiN(C_2F_5SO_2)_2$ in various mixed solvents shown in Table 7 (in a volume ratio of 1:1) and the nonaqueous electrolytes thus obtained were employed. Then, tests of charge-storage characteristics were carried out on the same conditions as in Example 1. Table 7 shows the results. Table 7 also shows the test results of the battery A39 according to the invention transferred from Table 5.

TABLE 7

| Battery | Solvent (all molar ratio is 1:1) | Discharge capacity before storage C1 (mAh) | Discharge capacity after storage C2 (mAh) | Capacity survival rate (%) |
| --- | --- | --- | --- | --- |
| A39 | EC + DEC | 580 | 505 | 87.1 |
| A53 | EC + DMC | 575 | 490 | 85.2 |
| A54 | EC + MEC | 575 | 495 | 86.1 |
| A55 | PC + DMC | 570 | 480 | 84.2 |
| A56 | γ-BL + DEC | 565 | 470 | 83.2 |

EC: ethylene carbonate
DMC: dimethyl carbonate
PC: propylene carbonate
DEC: diethyl carbonate
MEC: methyl-ethyl carbonate
γ-BL: γ-butyrolactone As shown in Table 7, the batteries A39, A53 to A55 according to the invention are particularly superior in the aspect of charge-storage characteristic. It is understood from this fact that in case of employing a mixed solvent, it is preferable to employ the mixed solvent comprising cyclic carbonate and linear carbonate. It was further acknowledged that the volume ratio between two carbonates is preferably in a range of 4:1 to 1:4.

Example 9

In this example, with respect to the lithium secondary battery of which positive electrode active material is $LiMn_2O_4$, a relation between the kind of negative electrode material and the charge-storage characteristic was examined.

Batteries A57, A58 according to the invention were prepared in the same manner as in the preparation of the battery A39 according to the invention, except that the artificial graphite ($d_{002}$=3.37 Å; Lc=200 Å) or coke ($d_{002}$=3.38 Å; Lc=20 Å) was employed as the negative electrode material instead of natural graphite. Then, tests of charge-storage characteristic were carried out on the same conditions as in Example 1. Table 8 shows the results. Table 8 also shows the test results of the battery A39 according to the invention transferred from Table 5.

TABLE 8

| Battery | Negative electrode material | Discharge capacity before storage C1 (mAh) | Discharge capacity after storage C2 (mAh) | Capacity survival rate (%) |
| --- | --- | --- | --- | --- |
| A39 | Natural graphite | 580 | 505 | 87.1 |
| A57 | Artificial graphite | 575 | 500 | 87.0 |
| A58 | Coke | 570 | 475 | 83.3 |

It is understood from Table 8 that in view of obtaining a lithium secondary battery of superior charge-storage characteristic, it is more preferable to employ a graphite than to employ a coke as the carbon material. In addition, it was further acknowledged that it is preferable to employ a graphite in which spacing ($d_{002}$) between lattice planes (002) is not more than 3.37 Å, and length (Lc) of crystallite in the c-axis direction is not less than 200 Å.

What is claimed is:

1. A lithium secondary battery comprising a nonaqueous electrolyte obtained by dissolving an electrolytic salt in a solvent, a negative electrode comprising a negative electrode material and a positive electrode comprising a positive electrode active material, said electrolytic salt comprising:

at least one electrolytic salt A selected from the group consisting of $LiPF_6$, $LiAsF_6$, $LiSbF_6$, $LiBF_4$, $LiBiF_4$, $LiAlF_4$, $LiGaF_4$, $LiInF_4$ and $LiClO_4$, and at least one electrolytic salt B selected from the group consisting of $LiN(C_nF_{2n+1}SO_2)_2$ wherein n is an integer of 2, 3 or 4 and $LiC(C_mF_{2m+1}SO_2)_3$ wherein m is an integer of 2, 3 or 4, and said solvent being a mixed solvent comprising at least one cyclic carbonate and at least one linear carbonate in a volume ratio ranging from 4:1 to 1:4.

2. The lithium secondary battery according to claim 1, wherein said electrolytic salt A is $LiPF_6$ and said electrolytic salt B is $LiN(C_2F_5SO_2)_2$.

3. The lithium secondary battery according to claim 1, wherein a molar ratio between said electrolytic salt A and said electrolytic salt B is in a range of 1:9 to 9:1.

4. The lithium secondary battery according to any one of claims 1 through 3, wherein said at least one cyclic carbonate is selected from the group consisting of ethylene carbonate, propylene carbonate, vinylene carbonate and butylene carbonate.

5. The lithium secondary battery according to claim 1, wherein said negative electrode material is a metallic lithium, a lithium alloy, a carbon material or a metal oxide having an electric potential lower than that of said positive electrode active material.

6. The lithium secondary battery according to claim 5, wherein said negative electrode material is a carbon material having a spacing ($d_{002}$) between lattice planes (002) of not more than 3.37 Å and having a length (Lc) of crystallites in the c-axis direction of at least 200 Å.

7. The lithium secondary battery according to claim 1, wherein said positive electrode active material is a composite oxide comprising Li and at least one transition metal.

8. The lithium secondary battery according to claim 7, wherein said at least one transition metal is selected from the group consisting of Co, Ni, Mn and Fe.

9. The lithium secondary battery according to claim 1, wherein said positive electrode active material comprises partially or entirely a manganese-containing oxide.

10. The lithium secondary battery according to claim 9, wherein said manganese-containing oxide is selected from the group consisting of $MnO_2$, $LiMn_2O_4$, $LiNi_{0.8}Co_{0.1}Mn_{0.1}O_2$, $Li_2CoNi_{0.8}Mn_{0.2}O_4$ and $LiNi_{0.5}Co_{0.3}Mn_{0.1}Fe_{0.1}O_2$.

11. The lithium secondary battery according to claim 1, wherein said at least one linear carbonate is selected from the group consisting of dimethyl carbonate, diethyl carbonate and methylethyl carbonate.

12. The lithium secondary battery according to claim 11, wherein said at least one cyclic carbonate is selected from the group consisting of ethylene carbonate, propylene carbonate, vinylene carbonate and butylene carbonate.

13. The lithium secondary battery according to claim 12, wherein said electrolytic salt A is $LiPF_6$ and said electrolytic salt B is $LiN(C_2F_5SO_2)_2$.

14. The lithium secondary battery according to claim 13, wherein a molar ratio between said electrolytic salt A and said electrolytic salt B is in a range of 1:9 to 9:1.

* * * * *